United States Patent

Giamati et al.

[11] Patent Number: 5,290,996
[45] Date of Patent: Mar. 1, 1994

[54] MODULAR DRAINMAST FOR AIRCRAFT

[75] Inventors: Michael J. Giamati, Akron; Tommy M. Wilson, Stow, both of Ohio

[73] Assignee: The B. F. Goodrich Company, Akron, Ohio

[21] Appl. No.: 839,866

[22] Filed: Feb. 21, 1992

[51] Int. Cl.⁵ .................. H05B 1/00; B64D 1/00; B64C 1/00
[52] U.S. Cl. .................. 219/201; 244/136; 244/129.1; 392/320; 392/478
[58] Field of Search .............. 219/200, 201; 392/480, 392/468, 320, 472, 478; 244/136, 129.1; 60/39.094

[56] References Cited

U.S. PATENT DOCUMENTS

| | | | |
|---|---|---|---|
| 2,984,107 | 5/1961 | Strieby | 73/182 |
| 3,378,673 | 4/1968 | Hopper | 392/480 |
| 4,038,519 | 7/1977 | Foucras | 219/505 |
| 4,275,603 | 6/1981 | Kalocsay | 219/201 |
| 5,046,360 | 9/1991 | Hedberg | 73/182 |
| 5,104,069 | 4/1992 | Reising | 244/136 |

Primary Examiner—Bruce A. Reynolds
Assistant Examiner—Michael D. Switzer
Attorney, Agent, or Firm—David M. Ronyak; Richard A. Romanchik

[57] ABSTRACT

A modular drainmast assembly for an aircraft includes a drain tube assembly removably enclosed in a fairing that is removably attachable to an aircraft. The electrically heated drain tube assembly may be accessed in the field for service, repair or replacement.

23 Claims, 5 Drawing Sheets

MODULAR DRAINMAST FOR AIRCRAFT

BACKGROUND OF THE INVENTION

This invention pertains to a drain apparatus, particularly a drainmast for aircraft, and particularly to a modular drainmast including a drain tube removably enclosed in a fairing that is removably attachable to an aircraft.

A drainmast is used to eject waste water from an aircraft waste system during flight without impingement of the ejected fluid further aft on the body of the aircraft, and to drain the waste system when on the ground.

As used herein the term "waste water" means undesired water-based liquids that accumulate during operation of an aircraft on the ground and in flight. Waste water is generated by many sources, one common source being the aircraft galley in which water, soft drinks, coffee, wine, orange juice and other potable liquids are collected. Waste water can also accumulate from engine and other air inlets that trap water from condensation or ingest rain.

A drainmast generally comprises a drain tube enclosed within an aerodynamically shaped, drag minimizing fairing that when installed protrudes downwardly from the underside of an aircraft such that its outlet extends into the surrounding airflow stream during flight. It may be swept aftwardly of the aircraft with the direction of airflow. The drain tube is coupled to the aircraft waste water storage tank and is heated to avoid freezing. In certain applicatons waste water is accumulated until it reaches a certain volume. Thereupon a valve inside the aircraft opens and the waste water drains from the tank through the drainmast. In other applications, the waste water is continuously drained.

There are two prevalent configurations for drainmasts. One is herein referred to as a bottom discharge mast. The other configuration is herein referred to as a rear discharge mast.

In a bottom discharge drainmast, the waste water is ejected generally perpendicularly to surrounding airflow. The mast is generally straight and swept. The axis of the drain tube at the exit forms an acute angle with the axis at the entrance. The angle is usually close to the angle of sweep of the mast.

In a rear discharge drainmast, the mast is swept and wing shaped and tapers into an exit tube at the tip that is roughly parallel to surrounding airflow. Water is ejected parallel to the surrounding airflow from the rear of the mast. Since the axis of the drain tube at the exit is nearly perpendicular to the axis at the entrance, the drain tube is either bent in a smooth curve or is fabricated from two or more straight sections that together form the appropriate angle.

The rear discharge mast is believed to be preferable to the bottom discharge mast. A portion of the water ejected from a bottom discharge mast has a tendency to adhere to the tip of the mast and dribble back driven by surrounding airflow. Much of it can freeze to the mast before it is blown away. In contrast, a properly designed rear discharge mast generates a suction action as surrounding airflow passes around the exit tube. Ejected water is sucked out of the tube into surrounding airflow. Very little if any water adheres to the mast.

Drainmasts have been used on aircraft for many years. A common design developed for early commercial jet aircraft and still in use today is a rear discharge configuration and includes a fairing consisting of two shaped aluminum halves that are fastened together with screws. Each fairing half has a channel that receives the drain tube. The drain tube is formed from stainless steel or copper. Silicone elastomer tape is wrapped around the tube in several locations. The tape compresses when the halves are screwed together and firmly locates the tube in the mast. Because clearance between the tube and the mast is very small, considerable heat loss to and through the fairing occurs. The drain tube is either bent or fabricated from multiple sections. The drain tube cross section is oddly shaped ranging from oblong to triangular. Some designs have a cross section that changes between the inlet and the outlet. This design is suspected of being more susceptible to clogging than drain tubes of constant cross section. The drain tube is locally heated by fixed resistance ceramic type resistors. Heating along the length of the drain tube is provided only by heat conduction along the tube. A heated portion of the drain tube extends out of the drainmast at the tube exit to prevent freezing of residual water. Sustained temperature of the drain tube can reach 700° F. The exterior of the drainmast can reach temperatures on the ground which present a hazard to service personnel. Some designs are open at the top where the drainmast mates with the aircraft. This can present a fire hazard if hydraulic fluid or lubricating oils leak into the drainmast and contact the heating elements.

Another known drainmast design is of bottom discharge configuration and has a fairing that is formed from two pieces of compression molded fiber reinforced plastic. The two halves are fastened together with adhesive and screws. The drain tube is copper, has a constant round cross section, and is attached to a shaped metal tip that covers the end of the mast. The heating element is wire or foil encapsulated in silicone rubber. The heating element is bonded to the outside of the tube and inside the metal foot that covers the end of the drainmast. The heated metal foot is required to prevent discharged waste water residue from freezing to the drainmast. As discussed previously, this is an inherent problem with bottom discharge drainmasts. The drain tube is sandwiched between the fairing halves which are mated to the metal foot. The entire assembly is filled with expanding foam. The resulting unit is integral and cannot be dissembled without damaging the components. The top of the unit is sealed where it mates with the aircraft. A controller inside the aircraft cycles power to the heating element to maintain temperature within preset limits. Power is transferred to the drainmast via a connector that is attached to the mounting base of the mast.

A more recent known drainmast design also utilizes a fiber reinforced plastic fairing. Mirror image fairing halves are formed from resin impregnated fabric that is laid into a female mold, vacuum bagged, and cured under heat and pressure, and trimmed after molding. The drain tube is formed from fiber reinforced plastic and has an integral heating element encapsulated in fiber reinforced plastic and bonded to the outside of the tube. The fairing halves are bonded together with the drain tube sandwiched in between. Lightweight filler material such as polyurethane expanding foam occupies the void in between the tube and fairing. The resulting drainmast is integral and cannot be disassembled without damage or destruction of the drainmast assembly. A heated foot is not required because the rear discharge feature is utilized. The heating element for this drainmast design is a pattern of wire that has a high positive coefficient of electrical resistivity. As the element heats the resistance increases which causes supply current to decrease. A steady power consumption and drain tube temperature is reached the values of which depend on the operating environment of the drainmast. This feature is referred to as a self regulating heating element. An electrical controller inside the aircraft is not required which greatly simplifies the system. A thermoswitch may be located inside the drainmast. The thermoswitch is operably connected to cause opening of the power supply circuit when the thermoswitch temperature is above a preset value to prevent current from flowing to the heating element when outside air temperature is above freezing. This feature is desirable to prevent overheating the fiber reinforced plastic fairing. It also serves to decrease overall power consumption of the drainmast. All electrical components are encapsulated inside the drainmast and cannot be removed.

Yet another recent known drainmast design has a fairing consisting of fiber reinforced plastic that is resin transfer molded in one piece. As in other known embodiments the drain tube and thermoswitch are integrally molded in place inside the fairing during the resin transfer molding process and cannot be removed without damage or destruction.

SUMMARY OF THE INVENTION

According to an aspect of the invention there is provided a drain tube apparatus for an aircraft drainmast assembly of the type that comprises a hollow fairing having a base for mounting to an aircraft that is joined to an aerodynamically shaped mast configured such that the mast protrudes into the surrounding airflow when the mounting base is attached to an aircraft, the mast having at its end distal the fairing an exit hole at the tip thereof, the drain tube apparatus comprising an drain tube assembly including an electrothermal heating element the drain tube assembly being adapted to be affixed at a single location relative to the fairing and extending through the hollow fairing without contact therewith and terminating at the exit hole and supported by an elastomeric fitting located in the exit hole which receives the end of the heated drain tube and resiliently supports the end of the heated drain tube within the mast at the exit hole, the drain tube assembly including an electrothermal heating element.

According to another aspect of the invention there is provided a heated drainmast assembly for an aircraft comprising:

a) a hollow fairing comprising a mounting base adapted to be affixed to an aircraft, the base being joined to an aerodynamically shaped mast configured such that the mast protrudes into the surrounding airflow when the mounting base is attached to an aircraft, the mast having at its end distal the mounting base at least one exit hole at the tip, b) at least one drain tube assembly including a drain tube including an electrothermal heating element, the drain tube supportively affixed to the fairing proximal to the mounting base and extending through the hollow fairing without contact and terminating at the exit hole, and c) an elastomeric fitting located in the exit hole which receives and resiliently supports the end of the heated drain tube within the mast at the exit hole.

The features and advantages of the present invention will become more apparent when viewed in light of the description of the best embodiment to the invention and drawings which follow, which together form a part of the specification.

DETAILED DESCRIPTION OF THE INVENTION

In the drawings, the rear of the drainmast is defined as that portion furthest downstream relative to surrounding airflow when the drainmast is installed on its intended airplane that is in flight. In the drawings like reference numerals designate like or corresponding parts throughout the several views.

Figure 1:
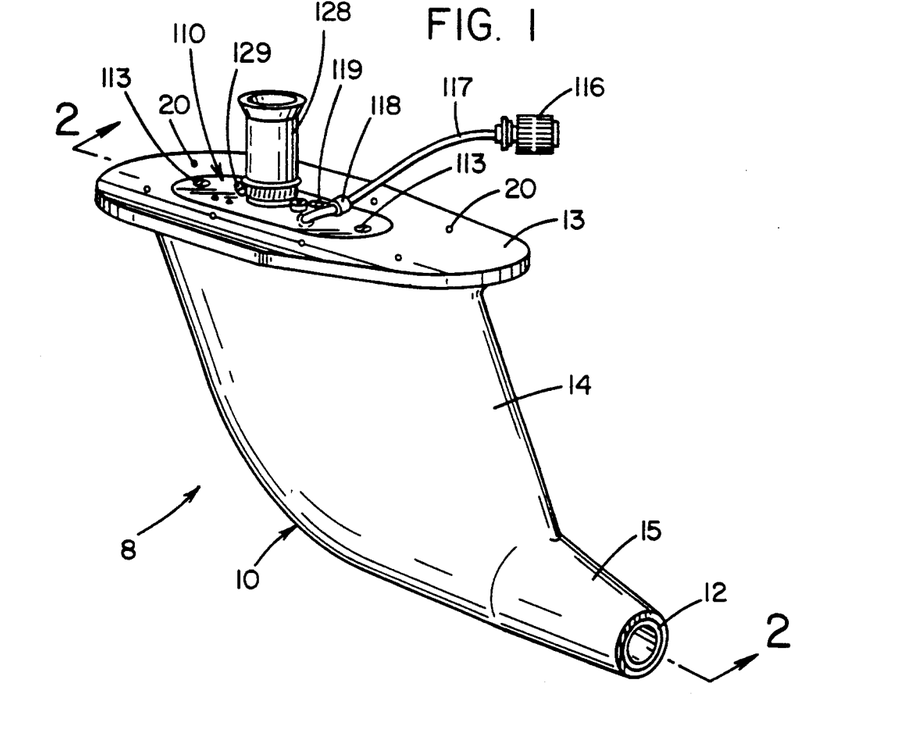
FIG. 1 is a pictorial view looking from the rear of a modular drain mast assembly according to the invention.
Figure 2:
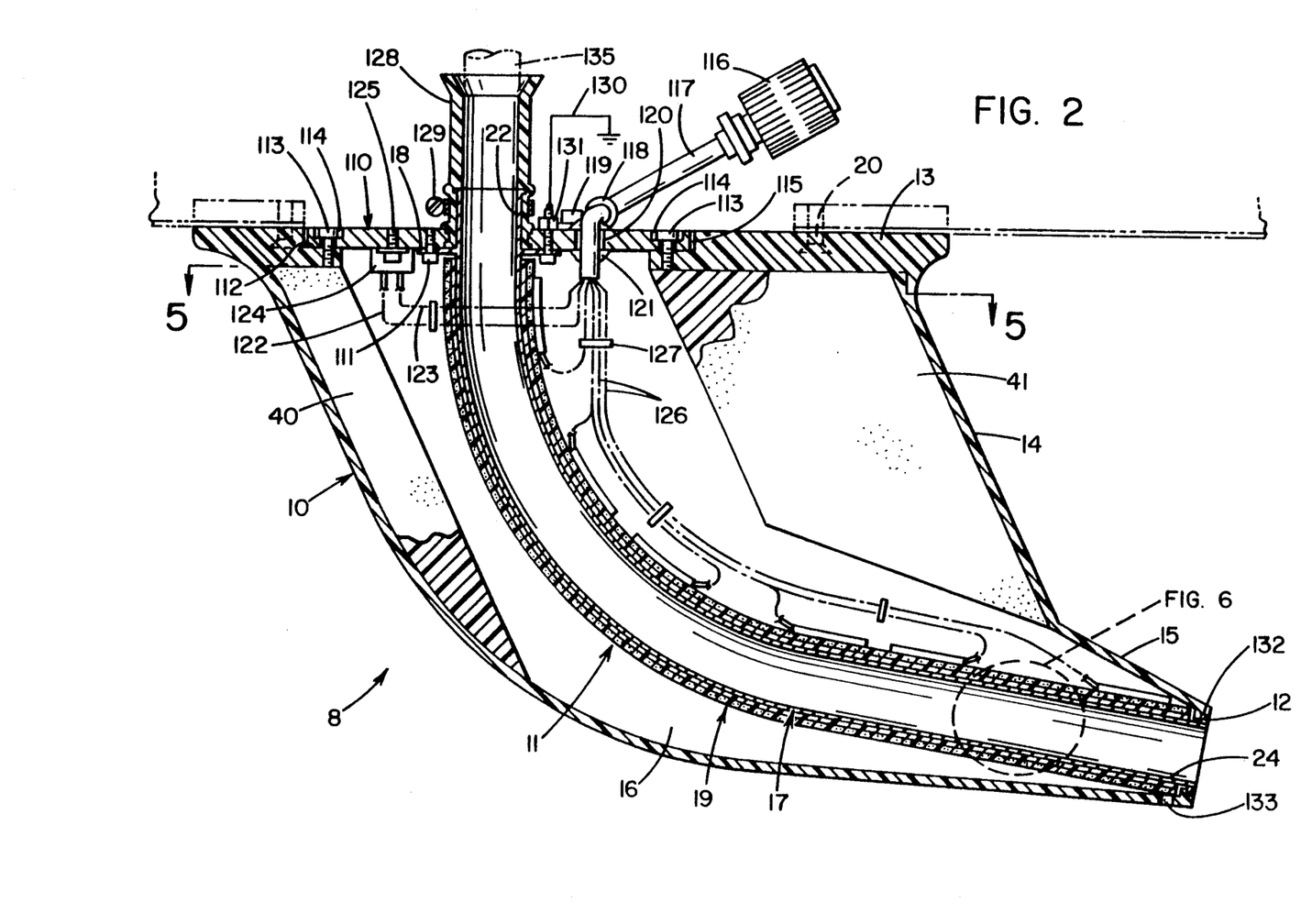
FIG. 2 is an enlarged side view in section of the drainmast assembly of FIG. 1.
Figure 5:
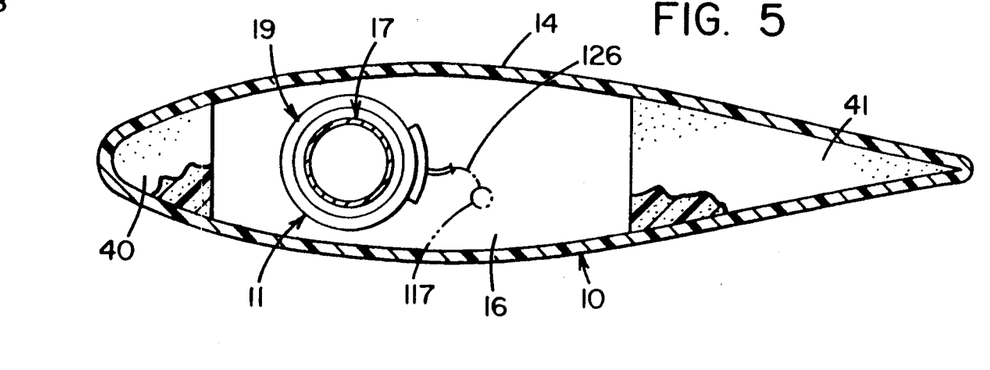
FIG. 5 is a plan section taken on line 5—5 of FIG. 2.

In FIGS. 1 and 2 there is shown a drainmast assembly 8 which includes fairing 10, drain tube assembly 11, and an elastomeric fitting 12. The fairing 10 comprises a mounting base 13, a mast 14 and an exit tube 15. In certain preferred embodiments these components of fairing 10 form a single integral piece. The fairing 10 includes a cavity or fairing hollow 16. As is best seen in FIG. 5, the fairing 10 is provided with leading edge foam core 40 and trailing edge foam core 41 for increased strength and rigidity. As shown in FIGS. 1 through 4, a plurality of mounting holes 20 are provided in the mounting base 13 for attaching the drainmast assembly 8 to the aircraft.

While the invention is described with regard to a one piece fairing 10, a multi-piece fairing may be used with the drain tube assembly 11 of the invention. However, a one piece fairing is much stronger because there is no seam line where mechanical failure can initiate. Of the known methods that may be used to form a one piece fairing, it is believed that resin transfer molding is the least expensive and provides the strongest part. In certain preferred embodiments a foam core is molded within the fairing and thereafter partially removed by mechanical means thereby forming the hollow 16. The ply lay-up of dry glass or other reinforcing fiber within the resin transfer mold, the determination of an optimum resin, and the actual molding process can be determined by a practitioner skilled in the art of resin transfer molding in known manner. High strength can be obtained by wrapping two-directional weave reinforcing cloth around the foam core thereby creating an array of continuous fibers around and along the drainmast. Additional fiber is provided in the corners of the mounting base to inhibit the formation of resin rich areas that are likely to chip. In certain preferred embodiments, room temperature curing polyester resin is used and the final fiber loading of the fairing is 30 to 40 percent.

Figure 3:
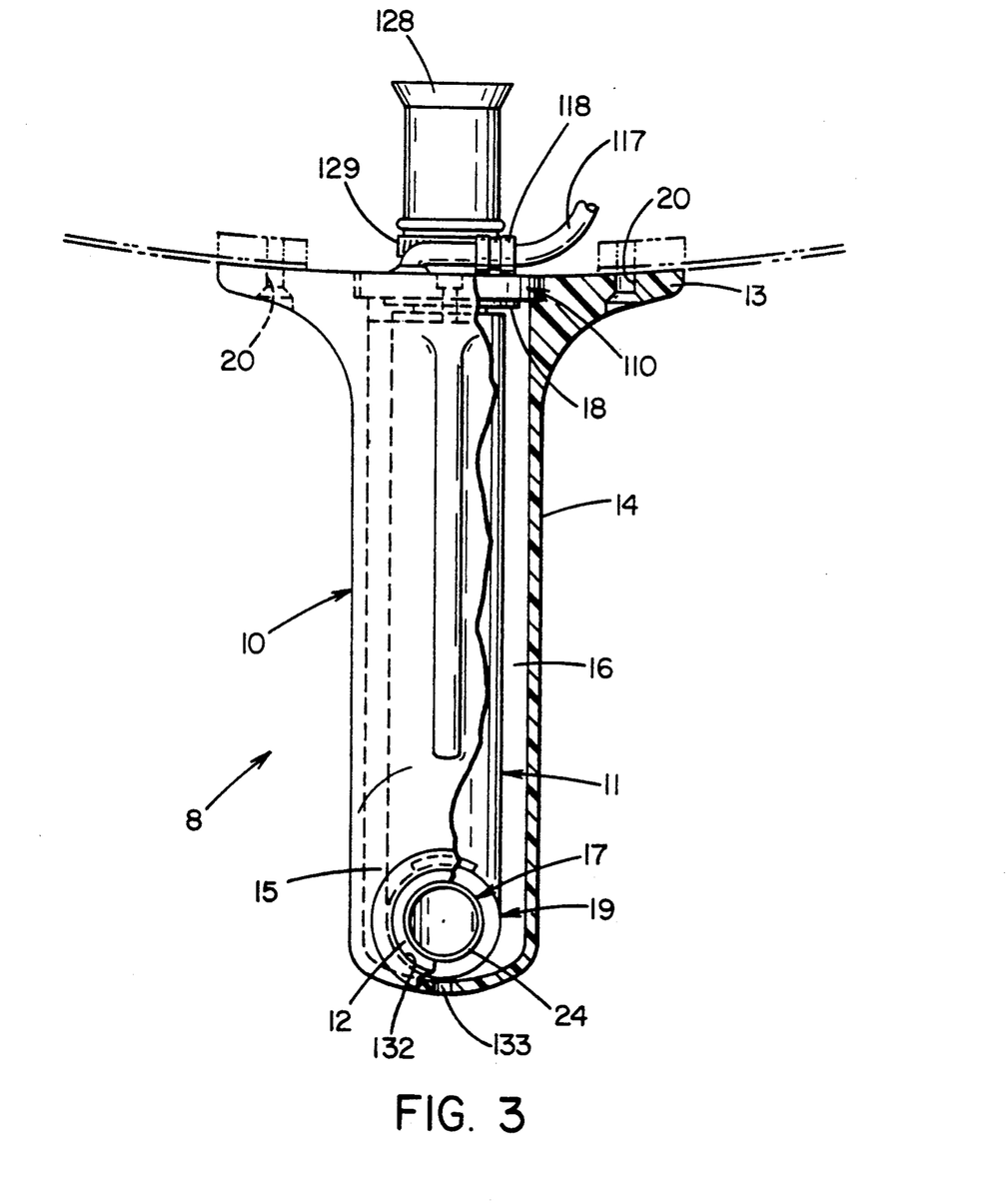
FIG. 3 is a right end elevation of FIG. 2 with parts broken away.
Figure 4:
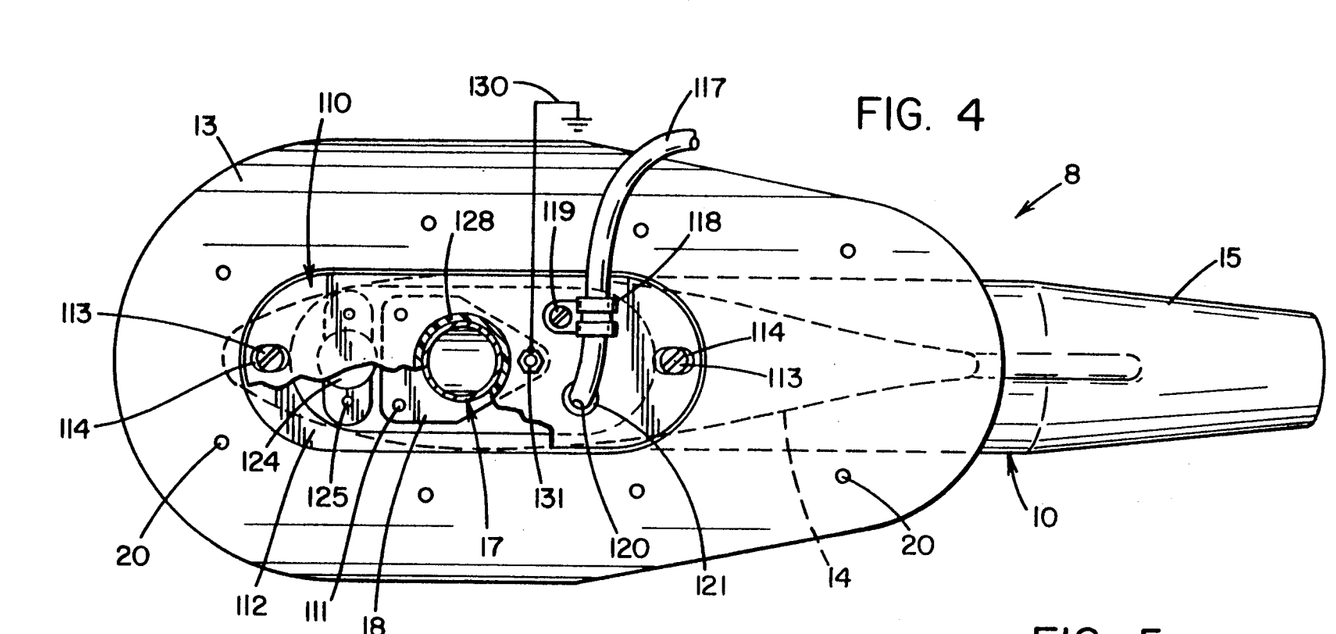
FIG. 4 is a plan view of FIG. 2 with parts broken away.

The drain tube assembly 11 comprises a drain tube 17, an electrothermal heater 19, and a drain tube flange 18. The drain tube 17 is rigidly attached to a drain tube flange 18 which is attached to an access plate 110 by screws 111. Though the illustrated embodiment uses three flange screws 111, this number is arbitrary and can be as few as one. The access plate 110 seats into a shoulder recess 112 in the mounting base 13. The recess 112 is complementary in shape and size to access plate 110 such that the top of the access plate 110 is flush with the top surface of the mounting base 13 when installed. The access plate 110 is held in place by access plate screws 113. The access plate 110 has slots 114 for receipt of access plate screws 113. Slots 114 permit fore and aft adjustment of the drain tube assembly 11 relative to the fairing 1 and compensate for dimensional variations that occur in manufacturing. Sealant layer 115 prevents fluids and other contaminants from penetrating into the fairing hollow 16. The end of outlet portion 24 of the drain tube 17 is resiliently and slidably supported within the aperture of annular elastomeric seal fitting 12 mounted within a recess 132 at the end of the exit tube 15. This manner of mounting the drain tube 17 enables relative movement between the tube 17 and the fairing 10 due to thermal expansion and contraction, seals the fairing 10 against entry of fluid exiting the tube, and facilitates removal and reinstallation of the tube for service or replacement. The annular elastomeric fitting 12 also serves to thermally isolate the drain tube 17 from the exit tube 15. FIGS. 2 and 3 present additional views of the annular elastomeric fitting 12 in relation to the fairing exit tube 15 and drain tube 17.

In certain preferred embodiments, the drain tube 17 is resiliently attached to the access plate 110 enabling additional movement for compensation of misalignment among the access plate 110, the mounting base 13, the exit portion 24 of the drain tube 17 and the annular elastomeric fitting 12. This feature may reduce manufacturing cost by allowing greater dimensional tolerances.

In certain preferred embodiments, the annular elastomeric seal fitting is formed from silicone elastomer. Other elastomeric materials can be used that have suitable mechanical and chemical properties.

As described hereinbefore, in certain known constructions a drain tube assembly (not illustrated) is molded into a fairing (not illustrated) as a part of the process of resin transfer molding of the fairing. Cyclic loading from thermal expansion and contraction of the drain tube during heating and cooling is transferred directly to the fairing and cracking of the fairing has been known to occur. The present invention solves this problem by allowing at least one end of the drain tube to move relative to the fairing, freely expanding and contracting without resistance. This feature is not restricted to a modular construction and could be applied equally as well if the drain tube were permanently attached to the fairing, for example by bonding the attachment plate to the mounting base of the fairing.

Figure 6:
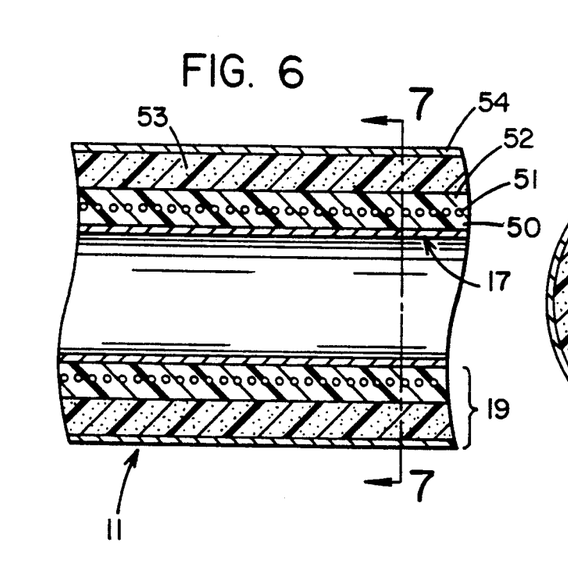
FIG. 6 is a further enlarged fragmentary sectional view of a portion of the draintube assembly.
Figure 7:
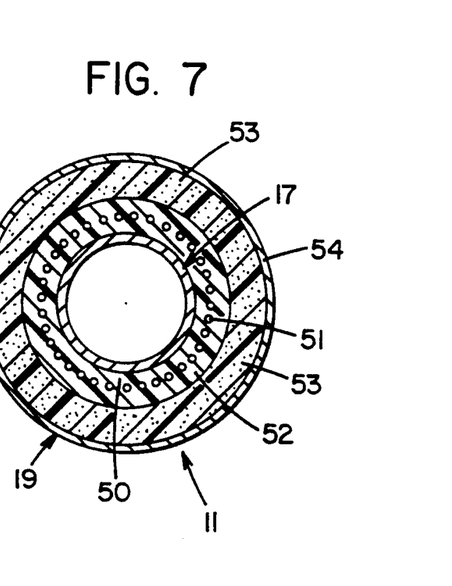
FIG. 7 is section taken on line 7—7 of FIG. 6.

As shown in FIGS. 6 and 7, the electrical heater 19 comprises heater wire 51 encapsulated in electrical insulating material 50 and 52, a layer of thermal insulation 53, and a radiant heat barrier 54 which in the embodiment shown is metallic foil. The electrical heater 19 is wrapped around and is bonded to the outside of the drain tube 17.

In certain preferred embodiments, the drain tube is formed from stainless steel, the insulating layers 50 and 52 are Permacell FS903 fiberglass supported silicone elastomer (thermoset) plies 0.023 inch thick, the thermal insulation 54 is Bisco Products Exobloc RF-100 foamed silicone elastomer with an integral outermost layer of aluminum foil that acts as the radiant heat barrier 54, and the heater wire composition is 70% nickel and 30% iron.

A wire composition of 70% nickel and 30% iron results in a self-regulating heater when properly designed. The design process iterates between design and experiment. The required power density in watts per unit area for the heater tube surface is analytically estimated based on a set of baseline operating conditions for the intended aircraft application. The pertinent operating parameters are the construction of the tube and fairing, flow rate and temperature of waste water through the tube, and outside conditions such as freestream velocity and temperature. A wire gauge providing a desired lineal resistivity in ohms per foot is chosen based on the desired power density and the wire spacing. As conditions change from the baseline condition, the element temperature tends to rise or fall depending on the condition and element resistance tends to rise and fall with the temperature. These changes in resistance cause corresponding inverse changes in power generation. For any given condition, the element will seek a steady state temperature. For silicone elastomer of a preferred embodiment, the highest acceptable steady state temperature is about 450° F. For certain fiber reinforced plastics the highest acceptable steady state temperature is about 300° F. A heater wire composition of 70% nickel and 30% iron provides enough change in resistance versus temperature that heaters can be designed to operate at or below these maximum steady state temperatures within acceptable limits of wire gauge and spacing.

The heating element may be manufactured as follows. A ply of fiberglass coated with uncured silicone elastomer is wrapped lengthwise around a stripper plate and placed on a winding jig that comprises two spaced rows of pins projecting from a plate. The heater wire is wound onto to the winding jig over the silicone ply. The stripper plate is removed with the silicone ply and wire pattern. The silicone ply and wire pattern are removed from the stripper plate and rolled flat. Another silicone ply is placed over the heater wire. A template is located over the uncured heater element assembly and the heater element assembly is trimmed to final shape. The flat pattern of the uncured element assembly should be such that it can be applied without wrinkling to a curved tube while being wrapped around the circumference of that tube. A stepped plug (not illustrated) is installed into the exit end of the drain tube to prevent the silicone elastomer from flowing all the way to the end of the tube thereby providing a stepped back shoulder. The end of the drain tube is thus not coated with silicone elastomer and is freely insertable into the aperture of elastomeric seal fitting 12. The drain tube is degreased and the uncured heater element assembly is wrapped lengthwise around the tube. Leadwires are silver soldered to the heater wires. A strip of nonadherent release fabric is spiral wrapped around the tube covering the surface of the uncured heating element. The uncured assembly is vacuum bagged and cured under heat and pressure in an autoclave. It is believed that oven curing may be used.

Another ply of fiberglass coated with uncured silicone elastomer material is applied to the outside of the cured heater element and a layer of thermal insulation is wrapped lengthwise around the heater element and drain tube. The assembly is spiral wrapped with nonadherent release fabric, vacuum bagged, and cured under heat and pressure in an autoclave. Finally, the part is post cured in an air circulating oven at 450° F. for three hours.

Many variations from the particular embodiment illustrated are possible. For example, in certain preferred embodiments the drain tube 17 can be formed from any suitable metal including copper or fiber reinforced plastic rather than stainless steel. The layer of thermal insulation 53 can be formed from a variety of commercially available insulating materials or eliminated altogether in certain applications. The same applies to the layer of radiant insulation 54.

In certain preferred embodiments, the electrical insulation layers 50 and 52 may be formed from any suitable heat resistant elastomeric material instead of silicone. A heat resistant elastomeric material is defined as an elastomeric material that retains suitable mechanical and electrical properties without degradation during sustained periods of drainmast operation. The electrical insulation layers could also be formed from heat resistant fiber reinforced plastic rather than elastomeric material.

As shown in FIGS. 2 and 5, the drain tube 17 and heater 19 pass through the fairing hollow 16 without touching the fairing walls. The dead air space within the fairing hollow thermally insulates and isolates the fairing from the heated drain tube assembly.

The power wires 126 are preferably arranged in a manner that avoids contact with the fairing walls. Their position is maintained by use of tie-wraps 127 as shown in FIG. 2. Contact of the power wires 126 or heater 19 with the fairing walls can cause wear and early failure.

In use, electrical current is supplied to the electrical heater 19 through a connector 116 and a cable 117. The cable 117 is attached to the access plate 110 by a cable clamp 118 and cable clamp screw 119 and passes through a cable hole 120 provided in the access plate 110. A cable seal 121 is provided where cable 117 passes through access plate 110 to prevent penetration of fluids and other contaminants into the fairing hollow 16. Two thermoswitch wires 122 and 123 exit the cable 117 and are connected to a thermoswitch 124. The thermoswitch 124 is mounted on the access plate 110 by screws 125. Power wires 126 are connected to the heater wires 51 of each of the three zones of the electrical heater 19. Cable tie-wraps 127 bundle the various wires 122, 123 and 126 at several locations. A ground strap 130 is attached to the access plate 110 by a ground strap screw 131.

In other embodiments, the electrical connector could be mounted directly to the top of the access plate or mounting base. However, in this location, the connector could be subjected to waste water leaking from the adapter fitting 128 or to other fluids leaking through the seal between the mounting base and the aircraft body (not illustrated). Corrosion of the connector from contact with these liquids has been known to occur. The illustrated embodiment avoids this problem by separating the connector from the mounting area on a cable.

Means must be provided to couple the drain tube 17 to the outlet nipple 135 of the aircraft waste water system. In the illustrated embodiment, a flexible adapter fitting 128 is attached to the drain tube by a hose clamp 129. Adapter fitting 128 is configured to sealingly engage the complimentarily sized and configured aperture in the access plate 110. In certain preferred embodiments the adapter fitting 128 is compressed as screws 111 are tightened to draw the drain tube flange 18 into contact with the underside of the access plate 110. The manner of coupling the drain tube to the aircraft waste water system outlet may be varied from that specifically illustrated and described depending on the application.

Figure 9:
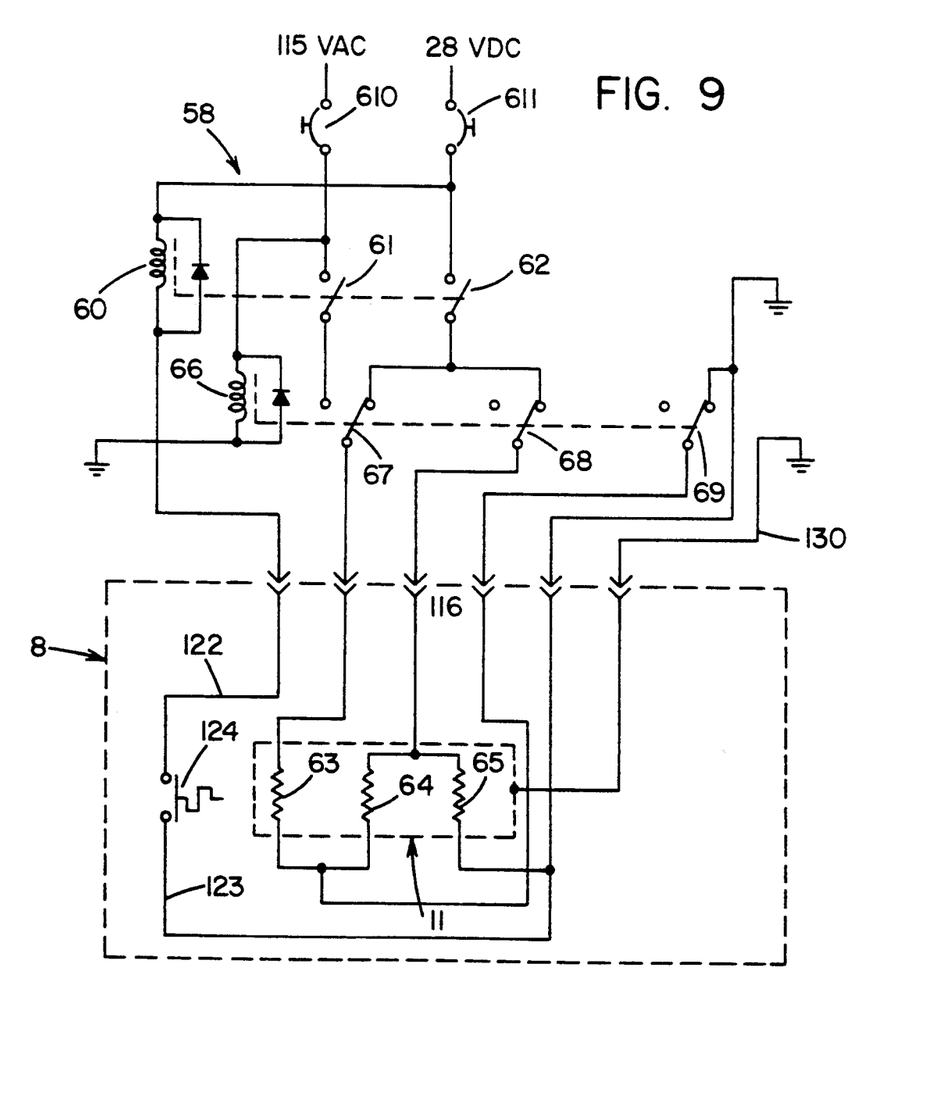
FIG. 9 is a schematic diagram of an electrical circuit for one embodiment of the invention.

A suitable circuit diagram for use with the invention is shown in FIG. 9. The circuit 58 operates on 115 VAC while the aircraft is xxx airborne and on 28 VDC while the aircraft is on the ground. The thermoswitch 124 opens the ground line 122 and 123 for the thermoswitch relay 60 when the thermoswitch temperature is above a preset value. The thermoswitch relay 60 thereupon opens relay contacts 61 and 62. When the aircraft is on the ground, and the thermoswitch 124 is closed, 28 VDC power is applied to the drain tube heater resistances 63, 64, and 65 through power control relay 66 contacts 67 and 68. Relay contact 69 provides an additional ground connection. In this 28 VDC configuration the heater resistances 63, 64, and 65 are connected in parallel to the 28 VDC power. When 115 VAC power is applied during flight, the power control relay 66 is activated which switches contact 67 to 115 VAC power and opens contacts 68 and 69. In this 115 VAC configuration the heater resistances 63, 64 and 65 are connected in series. Circuit breakers 610 and 611 are provided for safety.

A circuit of this complexity is not necessary in all preferred embodiments. For example, the heater element ground line could be routed through the thermostat and directly control current to the heater thereby eliminating the thermostat control relay 60. The number of zones provided depends on the design requirements of the particular intended application and may be as few as one or more than the three resistance zones 63, 64, and 65 illustrated in FIG. 9. Some applications may not require changing the connection of the resistance zones from parallel when 28 VDC is applied to series when 115 VAC is applied.

Figure 8:
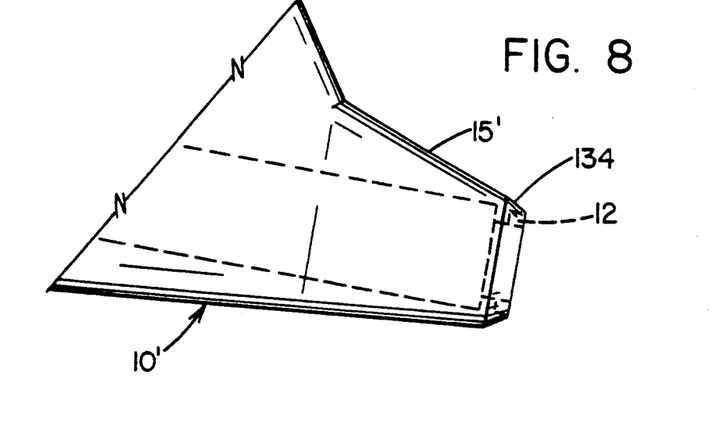
FIG. 8 is a fragmentary view of another embodiment of the fairing.

As illustrated in FIG. 8, in certain preferred embodiments, the exit tube 15' of fairing 10' is chamfered at the end where the outlet portion of the drain tube 17 exits the fairing 10'. This chamfer 134 directs the airflow over and around the exit tube 15' to prevent discharged waste water from collecting on the exit tube 15'.

We claim:

1. A drain tube apparatus for an aircraft drainmast assembly of the type that comprises a hollow fairing having a base for mounting to an aircraft that is joined to an aerodynamicaly shaped mast configured such that the mast protrudes into the surrounding airflow when the mounting base is attached to an aircraft, the mast having at its end distal the fairing an exit hole at the tip thereof, the drain tube apparatus comprising a drain tube assembly adapted to be affixed at a single location relative to the fairing and extending through the hollow fairing without contact therewith and terminating at the exit hole and supported by an elastomeric fitting located in the exit hole which receives the end of the heated drain tube and resiliently supports the end of the heated drain tube within the mast at the exit hole, the drain tube assembly including an electrothermal heating element.

2. The apparatus of claim 1 further comprising an access plate attached near one end of the tube.

3. The apparatus of claim 2 wherein the access plate is rigidly attached.

4. The apparatus of claim 2 further comprising a thermoswitch mounted to the access plate that prevents flow of electrical current to the heating element when thermoswitch temperature is above a preset value.

5. The apparatus of claim 1 further comprising a layer of thermal insulation overlying the heating element.

6. The apparatus of claim 5 further comprising a radiant heat barrier overlying the thermal insulation.

7. The apparatus of claim 6 wherein the radiant heat barrier comprises a layer of metallic foil bonded over the thermal insulation.

8. The apparatus of claim 1 wherein the heating element is encapsulated in heat resistant polymeric material.

9. The apparatus of claim 1 wherein the drain tube is formed from material from the group consisting of metals and fiber reinforced plastics.

10. The apparatus of claim 1 wherein the heating element comprises a pattern of wire having a high positive thermal coefficient of electrical resistivity encapsulated in electrically insulating material, the heating element being wrapped around and bonded to the outside of the drain tube and capable of providing heat to differing zones of the drain tube in predetermined amounts.

11. The apparatus of claim 1 wherein the drain tube assembly is removable from the drainmast without damage to the drain tube assembly.

12. A heated drainmast assembly for an aircraft comprising:
   a) a hollow fairing comprising a mounting base adapted to be affixed to an aircraft, the base being joined to an aerodynamically shaped mast configured such that the mast protrudes into the surrounding airflow when the mounting base is attached to an aircraft, the mast having at its end distal the mounting base at least one exit hole at the tip,
   b) at least one drain tube assembly including a drain tube including an electrothermal heating element, the drain tube supportively affixed to the fairing proximal to the mounting base and extending through the hollow fairing without contact and terminating at the exit hole, and
   c) an elastomeric fitting which receives and resiliently supports the end of the heated drain tube within the mast at the exit hole.

13. The drainmast assembly of claim 12 wherein the heated drain tube assembly is secured to the fairing by removable mechanical fasteners thereby facilitating removal of the heated drain tube.

14. The drainmast assembly of claim 12 wherein the mounting base is recessed and the drain tube assembly includes an access plate that mates with the recess and is attached to the mounting base by removable mechanical fasteners.

15. The drainmast assembly of claim 14 wherein the access plate sealingly covers the fairing hollow when seated in the recess and is attached to the mounting base by removable mechanical fasteners, thereby preventing entry of fluids and other contaminants into the fairing hollow.

16. The drainmast assembly of claim 12 wherein the elastomeric fitting is secured to the fairing tip within the mast exit hole and sealingly supports the drain tube, the seal preventing penetration of fluids and other contaminants into the fairing hollow between the fairing tip and the drain tube.

17. The drainmast assembly of claim 12 further comprising provision of a breather hole to the fairing hollow in a location where fluids and other contaminants are not likely to enter the fairing hollow when in service on the aircraft.

18. The drainmast assembly of claim 12 wherein the fairing is resin transfer molded.

19. The drainmast assembly of claim 12 wherein the electrically heated drain tube is self-regulating, the heating element comprising a pattern of wire having a high positive thermal coefficient of electrical resistivity encapsulated in electrically insulating material, the heating element wrapped around and bonded to the outside of the tube and capable of providing heat to differing zones of the tube in predetermined amounts.

20. The drainmast assembly of claim 14 further comprising a thermoswitch mounted on the access plate inside the fairing hollow that prevents electrical current from flowing to the heating element when thermoswitch temperature is above a preset value.

21. The drainmast assembly of claim 12 further comprising a layer of thermal insulation overlying and bonded to the heating element.

22. The apparatus of claim 12 wherein the fairing comprises a hollow, one piece fiber reinforced plastic fairing consisting of a wide elongated mounting base that tapers into a thin wing shaped mast which further tapers into an exit tube, arranged so the mast is angularly oriented to the mounting base and protrudes into the surrounding airflow when installed on an aircraft, the chord of the mast being aligned with the chord of the mounting base and the surrounding airflow, and the exit tube being located at the tip of the mast with its axis closely aligned with the surrounding airflow.

23. The drainmast assembly of claim 22 wherein the end of the mast exit tube is chamfered.

* * * * *